Aug. 11, 1942.     T. L. LOVE, JR     2,293,005
CRANKCASE GUAGE ATTACHMENT
Filed May 22, 1940
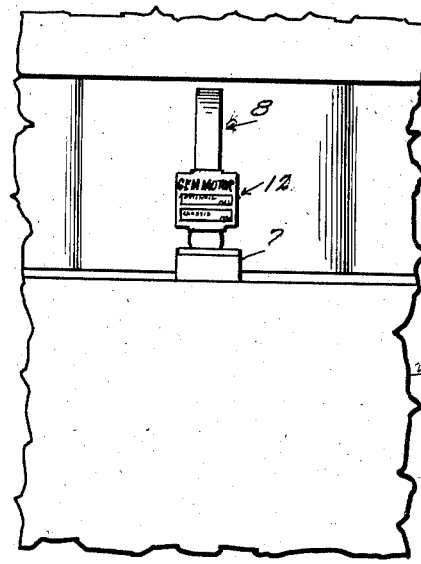
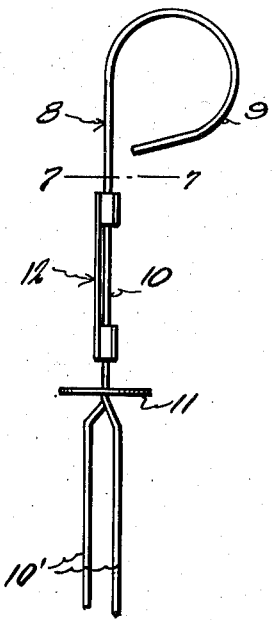
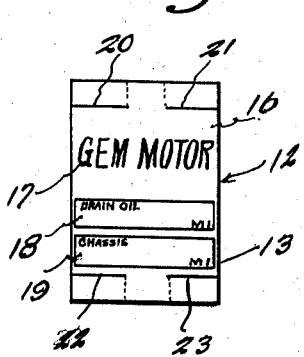
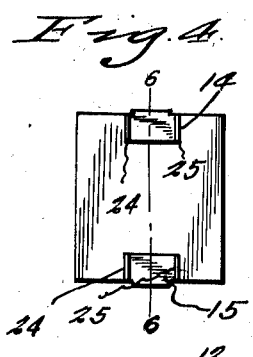
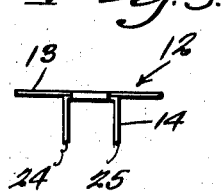
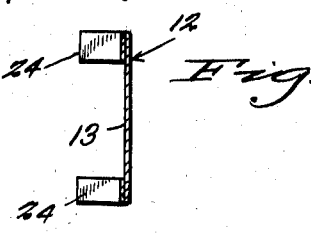
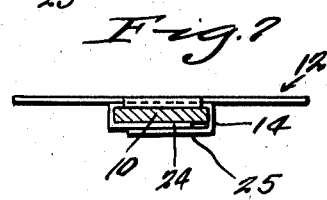
Inventor
*Thomas L. Love, Jr.*
By *Clarence A. O'Brien*
Attorney Patented Aug. 11, 1942

2,293,005

UNITED STATES PATENT OFFICE 2,293,005

CRANKCASE GAUGE ATTACHMENT

Thomas L. Love, Jr., Jackson, Calif.

Application May 22, 1940, Serial No. 336,628

1 Claim. (Cl. 40—23)

My invention relates to the combination with an ordinary automobile crankcase oil gauge or dip stick of means to show the date and mileage of the previous or of the next oil change, and other information in connection with the lubrication of the automobile, and the primary object of my invention is to provide a simple and efficient arrangement of this character.

Other important objects and advantages of my invention will be apparent from a reading of the following description taken in connection with the drawing, wherein for purposes of illustration I have shown a preferred embodiment of my invention.

In the drawing:

Figure 1 is a fragmentary elevational view of the side of an internal combustion engine, such as an automobile engine, showing the ordinary dip stick gauge for gauging the level of the oil in the crankcase, the said dip stick or gauge being altered in accordance with the present invention.

Figure 2 is a fragmentary side or edge elevational view of the dip stick in accordance with the present invention.

Figure 3 is a plan view of the blank from which the attachment is formed.

Figure 4 is a rear elevational view of the formed blank.

Figure 5 is a top plan view of Figure 4.

Figure 6 is a transverse vertical sectional view taken through Figure 4 approximately on the line 6—6.

Figure 7 is a horizontal sectional view taken through Figure 2 approximately on the line 7—7.

Referring in detail to the drawing, the numeral 5 generally designates the internal combustion engine which includes the crankcase 6 including a member 7 which is provided with an opening receiving the dip stick or oil gauge which is generally designated 8 which is adapted to project down into the crankcase and be immersed in the oil therein, so as to show on the lower part of the dip stick the level at which the oil stands in the crankcase, to show whether or not oil should be added. This dip stick usually comprises a flat metal crook 9 from the staff of which depends a straight shank 10 which terminates in vertical legs 10' which enter the crankcase opening in the device 7, a washer 11 in the nature of a stop usually being provided at the upper ends of the elements 10', in accordance with a conventional arrangement.

The present invention modifies the form of dip stick by mounting on the straight shank portion 10 the indicating unit which is generally designated by the numeral 12 and which comprises the generally rectangular body 13 which is in the form of a thin plate, and the upper U-shaped bracket 14 and the lower U-shaped bracket 15 which project rearwardly from the back of the plate 13 and have end portions which are adapted to be bent around the portion 10 of the dip stick and overlapped on each other as clearly indicated in Figure 7 of the drawings, whereby the device 12 is securely mounted on the dip stick in a position to be readily seen by the service station man, either while the dip stick is in place in the opening in the crankcase or while the dip stick is removed for oil level inspection purposes. The front face 16 of the plate 13 may have advertising matter 17 thereon and below this a space 18 for writing the oil change mileage and the date of the last or of the next oil change, and a further space 19 for chassis lubrication data, so that these items are clearly visible when the dip stick is in view, as shown in Figure 1.

The brackets 14 and 15 are formed on the upper and lower parts of the plate 13 by cutting transversely disposed slots 20 and 21 from the opposite edges of the upper part of the plate, and by cutting similar slots 22 and 23 parallel with the lower edge of the said plate, then bending the resultant portions on a line aligned with the slot in a rearward and downward direction in case of the upper portion and in an upward and rearward direction in the case of the lower portion, and bending the arms rearwardly in a right angle direction as indicated in Figure 5. With the portion 10 of the dip stick 8 inserted between these arms, the said arms 24 and 25 are bent around the edges of the dip stick and overlapped as clearly shown in Figure 7, thereby securely mechanically and frictionally holding the device 12 in position on the dip stick.

Although I have shown and described herein a preferred embodiment of my invention, it is to be definitely understood that I do not desire to limit the application of my invention thereto, except as may be necessary in view of the scope of the subjoined claim.

Having described the invention, what is claimed as new is:

An information tag for attachment to a crankcase oil gauge stick comprising an elongated rectangular plate, a pair of end tabs in the longitudinal center of said plate extending inwardly from opposite ends of the plate, respectively, flat against one and the same side of the plate and integral with said ends, and a prong on each side edge of each tab extending at right angles from said side of the plate, said prongs being for folding around the edges of the stick.

THOMAS L. LOVE, Jr.